United States Patent Office 3,551,383
Patented Dec. 29, 1970

3,551,383
AROMATIC POLYAMIDE-ESTERS AND A PROCESS FOR PREPARING THEM
James C. Fang, Media, Pa., assignor to E. I. du Pont de Nemours and Company, Wilmington, Del., a corporation of Delaware
No Drawing. Filed June 30, 1967, Ser. No. 650,196
Int. Cl. C08g 20/30
U.S. Cl. 260—47  7 Claims

ABSTRACT OF THE DISCLOSURE

A polyamide-ester and process for making this polymer, which is convertible into a polyamide-imide, by polymerizing the mono-ester of trimellitic anhydride and an organic diisocyanate wherein the polyamide-ester has the following recurring structural units.

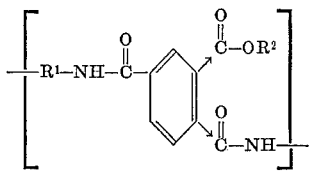

wherein the arrows denote isomerism, and in which $R^1$ is a divalent organic radical having at least 2 carbon atoms and $R^2$ is either an alkyl radical, aryl radical or a cycloaliphatic radical. A process for forming a polyamide-diester from the diester of pyromellitic dianhydride and an organic diisocyanate. The novel polyamide-ester is useful, for example, as a coating composition, an adhesive and as a wire enamel.

BACKGROUND OF THE INVENTION

This invention relates to polyamide-ester polymers and to their preparation. In particular, this invention relates to polyamide-ester polymers formed by reacting the mono-ester of a tricarboxylic anhydride and an organic diisocyanate that are relatively stable intermediates that are readily shaped and that can be easily converted into a polyamide-imide polymer.

Polyamide polymers have been prepared from a dicarboxylic acid and an organic diisocyanate as illustrated in Hanford and Holmes U.S. Pat. 2,284,896, issued June 2, 1942. But these polyamides, while very useful for forming fibers, coatings, films and the like, are not convertible into high temperature resistant structures containing polyimide linkages. Polyamide-imide foam structures have been prepared from diisocyanates and trimellitic anhydrides as shown in Frey U.S. Pat. 3,300,420, issued Jan. 24, 1967. However, these are foamed structures and not shapable intermediates which can easily be coated on substrates and converted into a polyamide-imide. Sorenson U.S. Pat. 3,312,663, issued Apr. 4, 1967, is directed to polyamide-esters which are shapable and are readily converted into a polyamide polymer. These polyamide-esters are formed by reacting the diester of a tetracarboxylic dianhydride, such as the diester pyromellitic dianhydride with an organic diamine. The novel polyamide-esters of this invention that are formed from a mono-ester of a tricarboxylic anhydride and an organic diisocyanate are convertible to a polyamide-imide that has advantages over the polymers of the Sorenson patent. While the polyamide-esters of the above Sorenson patent are excellent for many purposes as disclosed therein, the novel polymer of this invention generally has better adhesion, particularly to metal substrates, has excellent abrasion resistance and is generally of a lower cost than the polymers of the aforementioned Sorenson patent.

SUMMARY OF THE INVENTION

This invention concerns a novel polyamide-ester and a novel process for making the polymer by reacting a mono-ester of a tricarboxylic anhydride with an organic diisocyanate in which the polyamide-ester has the following recurring units:

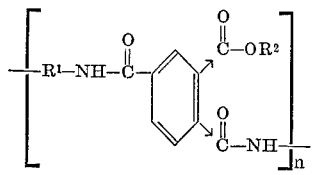

wherein the arrows denote isomerism; $R^1$ is a divalent organic radical having at least 2 carbon atoms; $R^2$ is either an alkyl radical containing 1–18 carbon atoms, aryl radical or a cycloaliphatic radical; and $n$ is an integer sufficiently high to provide a film-forming polymer that has an inherent viscosity at 25° C. of at least 0.15 at about 0.5% polymer solids in N-methyl pyrrolidone.

Preferably, in the polyamide-ester of this invention, $R^1$ is an alkylene radical having 2–6 carbon atoms or

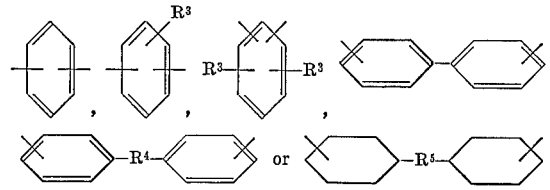

where $R^3$ is an alkyl radical of 1–3 carbon atoms; $R^4$ is an alkylene radical of 1–3 carbon atoms, —O—, —S—, or —SO$_2$—; $R^5$ is an alkylene radical of 1–3 carbon atoms; $R^2$ is either phenyl, cyclohexyl or an alkyl radical of 2–10 carbon atoms; and preferably, the inherent viscosity at 25° C. is 0.15–4, and more preferably, 0.5–2, measured at 0.5% polymer solids in N-methyl pyrrolidone.

Inherent viscosity which is directly related to molecular weight of the polymer is defined as follows:

$$\text{Inherent viscosity} = \frac{\text{Natural logarithm of the relative viscosity}}{C}$$

where the relative viscosity is the ratio of the solution viscosity to the solvent viscosity and C is the cencentration of solute in solution measured as grams of polymer per 100 milliliters of solution.

DESCRIPTION OF THE INVENTION

The novel process for producing the polyamide-ester of this invention comprises forming a mono-ester of an aromatic tricarboxylic anhydride and then reacting this product with an organic diisocyanate. In the esterification of the tricarboxylic anhydride to form the mono-ester, the anhydride, e.g., trimellitic anhydride, and the alcohol, for example, n-butanol, are dissolved in a common solvent, such as methylisobutyl ketone, methylethyl ketone, xylene, and the like, and are heaated to about 80–160° C. for about ½–3 hours. Preferably, the ingredients are heated to about 100–140° C. for about 1–2 hours to form the mono-ester. An inert solvent, i.e., inert to the reaction, is then added to the esterification product and the organic diisocyanate is then slowly added to the mixture and the mixture is heated to about 60–150° C. for about 2–10 hours to form the polyamide-ester of this invention. Preferably, the mixture is heated to about 80–100° C. for about 4–6 hours. The resulting polymer has an inherent viscosity of at least 0.15 at 25° C. at about 0.5% polymer solids in N-methyl pyrrolidone.

The aromatic tricarboxylic anhydride used in the process of this invention to form the novel polyamide-ester is preferably trimellitic anhydride, since this compound is readily available and forms polymers having excellent physical properties of tensile strength and elongation and resistance to high temperatures.

A variety of operable alcohols can be used to esterify the tricarboxylic anhydride; for example, aliphatic alcohols having 1–18 carbon atoms, such as methanol, ethanol, n-propanol, iso-propanol, n-butanol isobutanol, the pentols, the hexanols, 2-ethylhexanol, isooctanol, nonanol, decanol, lauryl alcohol, cetyl alcohol and octadecyl alcohol. Cycloaliphatic alcohols are also useful, such as cyclopropanol, cyclobutanol, cyclopentanol, cyclohexanol, cycloheptanol, cyclooctanol and the like. Particularly useful are hydroxyl terminated aromatic compounds, such as phenol, cresol, xylenol, p-phenyl phenol, α or β-naphthol and the like and aromatic alcohols. Useful aromatic alcohols are of the formula Ar—(CH$_2$)$_n$OH where $n$ is from 1–4 and Ar is a monovalent aromatic radical and are, for example, benzyl alcohol, 2-phenylethanol, 3-phenylethanol and 4-phenylbutanol.

The following are typical inert solvents which are used in the process of this invention to form the novel polyamide-ester: N-methylpyrrolidone, dimethylacetamide, dimethylformamide, hexamethylphosphoramide, dimethylsulfoxide, pyridine and the like.

The following organic diisocyanates are useful in the process of this invention for forming the novel polyamide-ester of this invention:

propylene-1,2-diisocyanate,
butylene-1,2-diisocyanate,
butylene-1,3-diisocyanate,
hexamethylene diisocyanate, and the like;
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as
methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate and the like;
methylene-bis-(4-phenyl isocyanate),
ethylene-bis-(4-phenyl isocyanate),
isopropylidene-bis-(4-phenyl isocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate,
2,2'-ketodiphenyl diisocyanate,
3,3'-ketodiphenyl diisocyanate,
4,4'-ketodiphenyl diisocyanate,
2,2'-thiodiphenyl diisocyanate
3,3'-thiodiphenyl diisocyanate,
4,4'-thiodiphenyl diisocyanate,
2,2'-sulfonediphenyl diisocyanate,
3,3'-sulfonediphenyl diisocyanate,
4,4'-sulfonediphenyl diisocyanate,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate), and the like.

Preferred organic diisocyanates used to form the novel polymer of this invention are toluene diisocyanate, xylylene diisocyanate, m-phenylene diisocyanate, 4,4'-methylene-bis-(4-phenyl isocyanate), 4,4'-methylene-bis-(cyclohexyl isocyanate) and hexamethylene diisocyanate.

After the novel polyamide-ester is formed by the process of this invention, it may be stored for later use or it may be used immediately to form shaped articles or as a coating composition. After the novel polyamide-ester is formed into a shaped article, e.g., a film, filament tube rod and the like, or applied as a coating or as an adhesive, it preferably is converted to its corresponding polyamide-imide. This is accomplished preferably by heating the polyamide-ester to about 150–400° C. for about 5–30 minutes, and more preferably, to about 175–300° C. for about 10–20 minutes. The resulting polyamide-imide has the following recurring structural units:

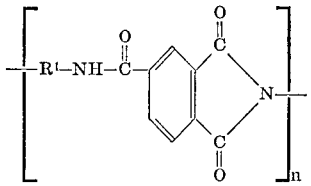

where R$^1$ is a divalent organic radical, and $n$ is an integer sufficiently high to provide an inherent viscosity at 25° C. of about 0.2–5 measured at about 0.5% polymer solids in a suitable solvent.

Inert materials may be added to the novel polyamide-ester of this invention, for example, pigments such as titanium dioxide, carbon black; metal particles, abrasives, and lubricating polymers. These materials are blended into the novel polymer composition using customary procedures such as ball milling, sand-grinding and the like. When used as a coating composition, the polyamide-ester can be applied by the usual techniques, e.g., doctoring, rolling, dipping, flowcoating, brushing, spraying and the like, to a great variety of substrates, such as copper, brass, aluminum, steel and other metals in the form of sheets, wires or screens. The novel polyamide-ester as a coating can also be applied to mineral structures, such as asbestos; to glass in the form of sheets, fibers or fabrics. The novel polyamide-ester of this invention can also be used as an adhesive composition and forms excellent adhesive bonds between such materials as metals, wood, polymeric materials and the like. The novel polymer is particularly useful as a high quality wire enamel for wires of copper, steel, aluminum and the like. The novel polymer can be applied by conventional wire coating techniques and equipment and gives a coating of excellent flexibility, good abrasion resistance and high dielectric strength.

Another aspect of this invention is the novel process of forming a polyamide diester which is convertible into a polyimide. The novel process for forming this polyamide-diester comprises esterifying a tetracarboxylic anhydride to form a diester diacid then polymerizing this diester diacid with an organic diisocyanate to form the polyamide-diester.

The aromatic tetracarboxylic dianhydride useful in this process for forming a polyamide-diester has the following formula:

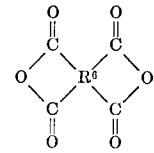

where R$^6$ is a tetravalent aromatic radical. Useful aromatic tetracarboxylic anhydrides are listed in columns 2 and 3 of the aforementioned Sorenson U.S. Pat. 3,312,663, which list is hereby incorporated by reference. Preferred of this group, because of its availability and cost, is pyromellitic dianhydride.

The diester diacid of the tetracarboxylic dianhydride is formed using any one of the aforementioned alcohols or hydroxyl terminated aromatic compounds. The aromatic compounds are preferred since the resulting polyamide-diester is readily converted at a low temperature to a polyimide. Typical solvents, such as methylethylketone and isobutylketone, are used. The esterification reaction requires a temperature of about 60–120° C. for about ½–3 hours.

This esterification product is then reacted with an organic diisocyanate to form a polyamide-diester which is convertible into a polyimide. The same organic diisocyanates, reaction temperatures, times and inert solvents are used to form this polyamide-diester as are used to form the novel polyamide-ester of this invention. To convert the polyamide-diester to a polyimide, about the same conditions are required as mentioned before to convert the novel polyamide-ester to a polyamide-imide.

The polyamide-diester formed by this novel process is similar to the product formed by the aforementioned Sorenson U.S. Pat. 3,312,663 and can be shaped, converted, pigmented and applied as a coating as suggested in Sorenson columns 4 and 5. The novel process of this invention presents another important and economical route to obtain a polyamide-diester. This novel process has advantages of cost and is a convenient reaction to obtain this polymer, and in some cases, a polymer can be formed that has superior properties to polymers formed by the process of Sorenson. The polymer is particularly useful as a high quality wire enamel and can be applied by conventional techniques and by using standard wire coating equipment.

The following examples illustrate this invention.

EXAMPLE 1

The following ingredients are charged into a reaction vessel:

| | Parts by weight |
|---|---|
| Methylisobutyl ketone (dried over a molecular sieve) | 200 |
| Trimellitic anhydride (dried at 150° C. for 1 hour) | 192 |
| N-butanol (dried over a molecular sieve) | 74 |
| Dimethyl acetamide (redistilled and stored over a molecular sieve) | 100 |
| Toluene-2,4-diisocyanate | 174 |
| Total | 740 |

The trimellitic anhydride, N-butanol and methylisobutyl ketone solvent are charged into a reaction vessel equipped with a stirrer, condenser, dropping funnel and thermometer, and the ingredients are thoroughly mixed. The mixture is heated to its reflux temperature (130° C.) and held at this temperature and then cooled to room temperature. A portion of the reaction mixture is removed and analyzed by an infrared spectrophotometer which indicated that the mono-butyl ester of trimellitic acid was formed. The dimethyl acetamide solvent is added and the solution is thoroughly mixed. Toluene diisocyanate is slowly added over about a 10-minute period with constant agitation. The reaction mixture is then heated to its reflux temperature (120–136° C.) for about 4 hours. The reaction mixture is then cooled to room temperature.

Infrared analysis shows that a polyamide-ester is formed. The inherent viscosity of the polymer is measured at 25° C. using a 0.5% solids solution in N-methyl pyrrolidone and is about 0.3.

A film is prepared from the polymer solution by casting a 5 mil thick wet film on a glass substrate and by drying this film at about 200° C. for about 20 minutes. The resulting polyamide-imide film is tough, durable and scratch resistant. A metal substrate is similarly coated with the polymer solution. The resulting coating is scratch resistant, flexible and has good adhesion to the metal substrate. A copper wire is coated with the polymer solution using standard wire coating techniques. The coating on the wire has excellent flexibility, good abrasion resistance and has a high dielectric strength.

EXAMPLE 2

A polyamide-ester polymer solution can be prepared by mixing in a reaction vessel, equipped as in Example 1, 1 mole of trimellitic anhydride with 1 mole of phenol and using methylisobutyl ketone as the solvent. The mixture is heated to its reflux temperature (120–140° C.) and held at this temperature for about 1 hour to form the phenyl ester of trimellitic acid. The mixture is cooled to room temperature and dimthyl acetamide solvent is added and mixed with the solution. About 1 mole of toluene-2,4-diisocyanate is then slowly added over about a 10 minute period with constant agitation. The reaction mixture is then heated to its reflux temperature about (130–150° C.) and held at this temperature for about 3–5 hours. The resulting polyamide-ester polymer solution should have an inherent viscosity at 25° C. using a 0.5% solids solution in N-methyl pyrrolidone of about 0.2 to 0.8.

A film can be prepared from the polymer solution by casting a 5 mil thick wet film on a glass substrate and by drying this film at about 200° C. for about 20 minutes. The resulting polyamide-imide film should be tough, durable and scratch resistant. A metal substrate can be similarly coated with the polymer solution. The resulting coating should be scratch resistant, flexible and have good adhesion to the metal substrate. A copper wire can be coated with the polymer solution using standard wire coating techniques. The coating on the wire should have excellent flexibility, good abrasion resistance and have a high dielec-strength.

EXAMPLE 3

A polyamide-ester polymer solution can be prepared by mixing in a reaction vessel, equipped as in Example 1, 1 mole of trimellitic anhydride with 1 mole of cyclohexanol and using methylisobutyl ketone as the solvent. The mixture is heated to its reflux temperature and held at this temperature for about 1 hour to form the ester of trimellitic acid. The mixture is cooled to room temperature and dimethyl acetamide is added and mixed with the solution. About 1 mole of hexamethylene diisocyanate is then slowly added over about a 10 minute period with constant agitation. The reaction mixture is then heated to its reflux temperature and held at this temperature for about 3–5 hours. The resulting polyamide-ester polymer solution should have an inherent viscosity at 25° C. using a 0.5% polymer solids solution in N-methyl pyrrolidone of about 0.5 to 1.

A film can be prepared from the polymer solution by casting a 5 mil thick wet film on a glass substrate and by drying this film at about 200° C. for about 20 minutes. The resulting polyamide-imide film should be tough, durable and scratch resistant. A metal substrate can be similarly coated with the polymer solution. The resulting coating should be scratch resistant, flexible and have good adhesion to the metal substrate. A copper wire can be coated with the polymer solution using standard wire coating techniques. The coating on the wire should have excellent flexibility, good abrasion resistance and have a high dielectric strength.

EXAMPLE 4

A polyamide-diester polymer solution is formed by charging the following ingredients into a reaction vessel equipped as in Example 1. About 21.8 parts by weight of pyromellitic dianhydride are thoroughly mixed with about 100 parts by weight methanol. The mixture is heated to its reflux temperature (64° C.) and held at this temperature for about 10 minutes. The methanol is then vacuum distilled from the mixture giving crystals of the dimethylester of pyromellitic acid. A sample is removed and analyzed by an infrared spectrophotometer which indicates that the dimethylester of pyromellitic acid is formed.

About 5.64 parts by weight of the above prepared dimethylester of pyromellitic acid is charged into a reaction vessel equipped as above with 5.00 parts by weight of 4,4'-methylene diphenyl diisocyanate and 25 parts by weight of distilled N-methyl pyrrolidone and thoroughly mixed. The mixture is heated to about 80–100° C. and held at this temperature for about 1 hour. The reaction mixture is then cooled to room temperature.

Infrared analysis shows that the polyamide-diester is formed. The polymer has an inherent viscosity of about 0.4–1 measured at 25° C. using a 0.5% polymer solids solution in N-methyl pyrrolidone.

A film is prepared from the polymer solution by casting a 5 mil thick wet film on a glass substrate and by drying this film at about 200° C. for about 20 minutes. The resulting polyamide-imide film is tough, durable and scratch resistant. A metal substrate is similarly coated with the polymer solution. The resulting coating is scratch resistant, flexible and has good adhesion to the metal substrate. A copper wire is coated with the polymer solution using standard wire coating techniques. The coating on the wire has excellent flexibility, good abrasion resistance and has a high dielectric strength.

Also related to this invention is a novel polymeric compound that can be formed by reacting at a lower temperature and for a shorter reaction time than is required for forming the novel polyamide-ester of this invention and that has at least two of the following recurring structural units:

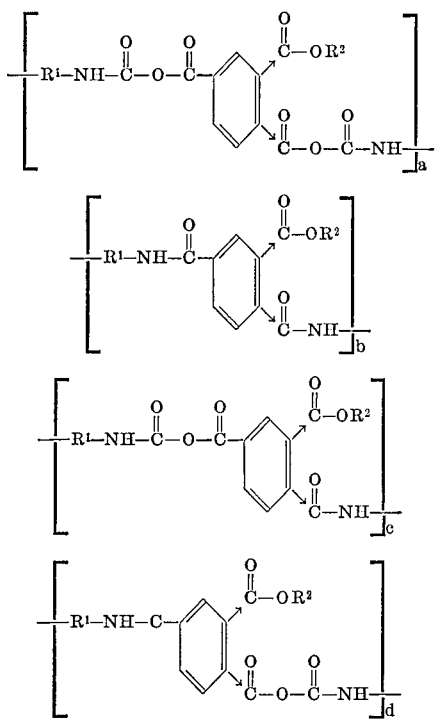

wherein the arrows denote isomerism; $R^1$ is a divalent organic radical having at least 2 carbon atoms; $R^2$ is either an alkyl radical containing 1–18 carbon atoms, aryl radical or a cycloaliphatic radical; and where $a$, $b$, $c$ and $d$ are positive integers, the sum of which is sufficiently high to provide a film-forming polymer having an inherent viscosity at 25° C. of at least 0.15 measured at about 0.5% polymer solids in N-methyl pyrrolidone. Preferred $R^1$ and $R^2$ radicals are the same as those aforementioned for the novel polyamide-ester of this invention.

One particular advantage of the above novel polymer is that it is soluble in common low cost solvents, such as xylene, toluene, methylethylketone, methylisobutylketone, and the like, and solutions of the polymer can be applied by conventional techniques to substances of metal, wire, high temperature polymers, Fiberglas, and the like. After application to a substrate, this novel polymer is readily converted, for example, by heating to about 150–400° C. to a high temperature resistant polyamide-imide polymer coating.

I claim:
1. A polyamide ester consisting essentially of recurring units of

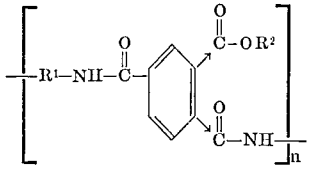

wherein the arrows denote isomerism; wherein $R^1$ is selected from the group consisting of an alkylene radical having 2–6 carbon atoms,

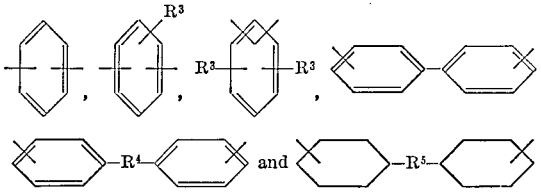

in which $R^3$ is an alkyl radical of 1–3 carbon atoms, $R^4$ is selected from the group consisting of an alkylene radical of 1–3 carbon atoms, —O—, —S—, and —SO$_2$—, $R^5$ is an alkylene radical having 1–3 carbon atoms, $R^2$ is selected from the group consisting of phenyl, cyclohexyl, naphthyl and an alkyl radical having 2–10 carbon atoms, and $n$ is integer sufficiently high to provide a film-forming polymer having an inherent viscosity at 25° C. of 0.15 to 4 at about 0.5% polymer solids in N-methyl pyrrolidone.

2. The polymer of claim 1 in which $R^1$ is an alkylene radical having 6 carbon atoms and $R^2$ is cyclohexyl.

3. The process of making a polyamide ester which comprises reacting a mono-ester of trimellitic anhydride of the formula

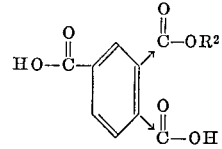

wherein the arrows denote isomerism with an organic diisocyanate of the formula $R^1(NCO)_2$ at about 60–150° C. in an inert solvent for about 2–10 hours to form a polyamide ester having an inherent viscosity at 25° C. of at least 0.15–4 measured at about 0.5% polymer solids in N-methyl pyrrolidone; wherein $R^1$ selected from the group consisting of an alkylene radical having 2–6 carbon atoms,

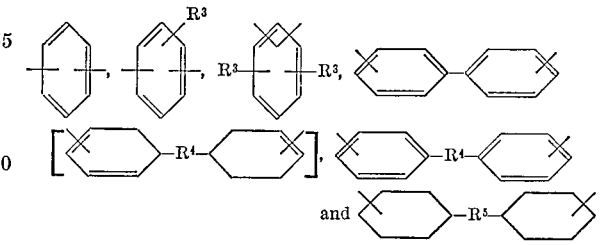

in which $R^3$ is an alkyl radical of 1–3 carbon atoms, $R^4$ is selected from the group consisting of an alkylene radical of 1–3 carbon atoms, —O—, —S—, and —SO$_2$—, $R^5$ is an alkylene radical having 1–3 carbon atoms, $R^2$ is selected from the group consisting of phenyl, cyclohexyl, naphthyl and an alkyl radical having 2–10 carbon atoms.

4. The process of claim 6 wherein $R^2$ is butyl and the organic diisocyanate is selected from the group consisting of toluene diisocyanate and methylene-bis-(4-phenyl isocyanate).

5. A coating composition comprising the polymer of claim 1 and a solvent for the polymer.

6. A coated sheet material comprising a coalesced layer of the polymer of claim 1 in firm adherence to a flexible substrate.

7. A coated wire comprising a coalesced layer of the polymer of claim 1 in firm adherence to the wire.

References Cited

UNITED STATES PATENTS

| 3,260,691 | 7/1966 | Lavin et al. | 260—30.2 |
| 3,300,420 | 1/1967 | Frey | 260—2.5 |
| 3,314,923 | 4/1967 | Muller et al. | 260—78 |
| 3,326,851 | 6/1967 | Tocker | 260—47 |

FOREIGN PATENTS

| 570,858 | 7/1945 | Great Britain | 260—78 |
| 676 | 1/1967 | Japan | 260—47 |
| 677 | 1/1967 | Japan | 260—47 |

WILLIAM SHORT, Primary Examiner

L. L. LEE, Assistant Examiner

U.S. Cl. X.R.

117—124, 126, 128.4, 132, 148, 161; 260—30.2, 30.6, 30.8, 32.4, 32.6, 32.8, 33.6, 37, 47, 63, 77.5

PO-1050
(5/69)

UNITED STATES PATENT OFFICE
CERTIFICATE OF CORRECTION

Patent No. 3,551,383          Dated December 29, 1970

Inventor(s) James C. Fang

It is certified that error appears in the above-identified patent and that said Letters Patent are hereby corrected as shown below:

Column 8, line 20, delete

" 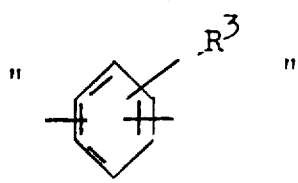 " and insert -- 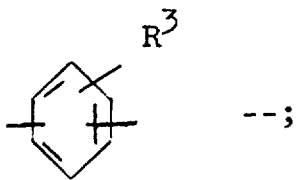 --;

Column 8, line 60, delete

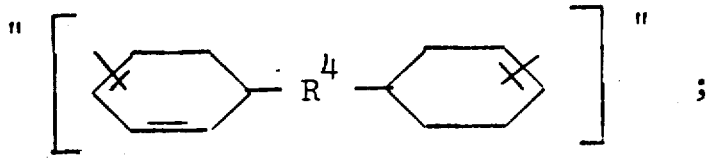 ;

Column 8, line 70, delete "6" and insert -- 3 --.

Signed and sealed this 23rd day of March 1971.

(SEAL)
Attest:

EDWARD M. FLETCHER, JR.
Attesting Officer

WILLIAM E. SCHUYLER, JR.
Commissioner of Patents

Notice of Adverse Decision in Interference

In Interference No. 98,577 involving Patent No. 3,551,383, J. C. Fang, AROMATIC POLYAMIDE-ESTERS AND A PROCESS FOR PREPARING THEM, final judgment adverse to the patentee was rendered Oct. 31, 1974, as to claim 1.

[*Official Gazette February 18, 1975.*]